(12) United States Patent
Yamano et al.

(10) Patent No.: US 9,116,420 B2
(45) Date of Patent: Aug. 25, 2015

(54) CENTRIFUGAL FAN FOR PROJECTOR HAVING INLET PORT AND ASSOCIATED INCLINED PORTION WIDENING IN DIRECTION OF IMPELLER

(75) Inventors: Daigo Yamano, Azumino (JP); Fumihide Sasaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 248 days.

(21) Appl. No.: 13/602,680

(22) Filed: Sep. 4, 2012

(65) Prior Publication Data

US 2013/0070211 A1 Mar. 21, 2013

(30) Foreign Application Priority Data

Sep. 16, 2011 (JP) .................................. 2011-202806

(51) Int. Cl.
*G03B 21/16* (2006.01)
*F04D 29/42* (2006.01)
*F04D 29/70* (2006.01)

(52) U.S. Cl.
CPC ............ *G03B 21/16* (2013.01); *F04D 29/4213* (2013.01); *F04D 29/4226* (2013.01); *F04D 29/703* (2013.01)

(58) Field of Classification Search
CPC ...... G03B 21/16; H04N 9/3144; F21V 5/001; F21V 7/20; F21V 29/00; F21V 29/02; F21V 29/025; F21V 29/027; F21V 29/20; F21V 29/40; F04D 29/42; F04D 29/4213; F04D 29/4226; F04D 29/44; F04D 29/442; F04D 29/444; F04D 29/424

USPC ............ 353/52, 57–58, 60–61; 362/218, 264, 362/294, 345, 373; 415/198.1, 199.3, 200, 415/203, 206, 204–205

See application file for complete search history.

(56) References Cited

U.S. PATENT DOCUMENTS

| | | | | |
|---|---|---|---|---|
| 3,295,456 | A | * | 1/1967 | Warren ......................... 416/182 |
| 4,915,583 | A | | 4/1990 | Vera et al. |
| 5,478,201 | A | * | 12/1995 | Amr .............................. 415/206 |
| 5,503,521 | A | * | 4/1996 | Capon ........................ 415/121.1 |
| 5,551,838 | A | * | 9/1996 | Hugbart ........................ 415/206 |
| 5,586,861 | A | * | 12/1996 | Berger .......................... 415/118 |
| 7,281,898 | B2 | * | 10/2007 | Baek et al. ................. 416/186 R |
| 7,311,494 | B2 | * | 12/2007 | Farag et al. ................... 415/206 |
| 7,705,922 | B2 | * | 4/2010 | Zheng et al. ...................... 349/5 |
| 7,887,290 | B2 | * | 2/2011 | Chen et al. .................... 415/206 |
| 8,540,374 | B2 | * | 9/2013 | Egawa et al. .................... 353/61 |
| 2002/0098084 | A1 | * | 7/2002 | Gatley, Jr. ..................... 415/206 |

(Continued)

FOREIGN PATENT DOCUMENTS

| | | |
|---|---|---|
| JP | S62-265498 | 11/1987 |
| JP | A-6-108998 | 4/1994 |

(Continued)

*Primary Examiner* — Toan Ton
*Assistant Examiner* — Jori Reilly-Diakun
(74) *Attorney, Agent, or Firm* — Oliff PLC (57) ABSTRACT

A centrifugal fan introducing air via an inlet port in a direction of a rotation axis and discharging the air via an outlet port in the a direction of a centrifugal force produced by rotation includes: an impeller having a plurality of vanes around the rotation axis; and a housing including the inlet port and supporting the impeller such that the impeller is allowed to freely rotate in the housing. An inclined portion is formed at least at a part of edge portion of the inlet port, the inclined portion widening to the side that the impeller is disposed.

6 Claims, 6 Drawing Sheets

(56) References Cited

U.S. PATENT DOCUMENTS

| | | | |
|---|---|---|---|
| 2005/0074332 A1* | 4/2005 | Adamski et al. | 415/211.1 |
| 2006/0292020 A1* | 12/2006 | Hwang et al. | 417/423.13 |
| 2010/0103382 A1* | 4/2010 | Onodera et al. | 353/52 |
| 2011/0019159 A1* | 1/2011 | Egawa et al. | 353/57 |

FOREIGN PATENT DOCUMENTS

| | | |
|---|---|---|
| JP | 2002021780 A | 1/2002 |
| JP | 2007278182 A | 10/2007 |
| JP | 2007303340 A | 11/2007 |
| JP | 2008280928 A | 11/2008 |

* cited by examiner

CENTRIFUGAL FAN FOR PROJECTOR HAVING INLET PORT AND ASSOCIATED INCLINED PORTION WIDENING IN DIRECTION OF IMPELLER

The entire disclosure of Japanese Patent Application No. 2011-202806, filed Sep. 16, 2011 is expressly incorporated by reference herein.

BACKGROUND

1. Technical Field

The present invention relates to a centrifugal fan, and a projector including this centrifugal fan.

2. Related Art

A projector or other apparatus known in the art introduces air from the outside and supplies the air to components and the like generating heat within the external casing of the apparatus, by using a cooling mechanism including a cooling fan so as to prevent temperature increase of these components. The apparatus also sucks the air within the external casing and discharges the air to the outside to prevent temperature increase in the interior of the external casing. The cooling fan is constituted by an axial fan which introduces air in the direction of its rotation axis and discharges the air in the direction of the same rotation axis, or a centrifugal fan which introduces air in the direction of its rotation axis and discharges the air in the direction of the centrifugal force produced by the rotation of the fan, for example.

In JP-A-6-108998, there is disclosed a cooling fan (centrifugal fan) which has a thick portion along the opening circumferential edge of an air inlet port formed in a fan case. According to this structure, at least the opening surface of the thick portion has a tapered shape or a convexly curved shape which is narrowed toward the interior of the fan case. This structure can prevent decrease in the intake amount of gas, and can reduce resonant oscillation generated in the fan case.

However, when the projector including the centrifugal fan falls, the impact force generated by the fall reaches the centrifugal fan, and possibly allows an impeller of the centrifugal fan to partially protrude to the outside through an opening corresponding to the air inlet port formed in a housing for supporting the impeller. In this case, the protruding portion of the impeller may catch on the edge of the opening when returning to the original position, resulting in such a condition that returning of the impeller to the original position is difficult. This engagement between the impeller and the edge causes malfunction of the centrifugal fan.

Accordingly, development of a centrifugal fan capable of preventing malfunction caused by drop impact, and a projector including this centrifugal fan has been demanded.

SUMMARY

An advantage of some aspects of the invention is to solve at least a part of the problems described above, and the invention can be implemented as the following forms or application examples.

APPLICATION EXAMPLE 1

This application example is directed to a centrifugal fan introducing air via an inlet port in a direction of a rotation axis and discharging the air via an outlet port in a direction of a centrifugal force produced by rotation includes: an impeller having a plurality of vanes around the rotation axis; and a housing including the inlet port and supporting the impeller such that the impeller is allowed to freely rotate in the housing. An inclined portion is formed at least at a part of edge portion of the inlet port, the inclined portion widening to the side that the impeller is disposed.

According to this centrifugal fan, the inlet port of the first housing port has the inclined portion which produces a wider cross section of the inlet port on the side facing to the impeller. This structure allows the impeller subjected to drop impact to contact the inclined portion, and then return to the original position. This mechanism avoids engagement between the impeller and the edge portion, thereby preventing malfunction of the centrifugal fan caused by the drop impact.

APPLICATION EXAMPLE 2

In the centrifugal fan of the above application example, it is preferable that the inclined portion of the centrifugal fan of the above application example has a convexly curved shape.

According to this centrifugal fan, the inclined portion having the convexly curved cross section can further securely prevent engagement between the impeller and the edge portion.

APPLICATION EXAMPLE 3

In the centrifugal fan of the above application example, it is preferable that an projecting portion is formed at least at the part of the edge portion of the centrifugal fan of the above application examples, the projecting portion projecting in a direction opposite to a direction introducing the air, and the inclined portion is formed at the projecting portion.

According to this centrifugal fan, the inclined portion can be formed on the projecting portion provided on the edge portion of the first housing portion even when the edge portion has a small thickness and therefore does not have a sufficient area for producing the inclined portion. Accordingly, this structure prevents engagement between the impeller and the edge portion of the first housing portion, and thereby avoids malfunction caused by drop impact even when the edge portion is thin. Moreover, this structure can increase the rigidity of the edge portion.

APPLICATION EXAMPLE 4

This application example is directed to the centrifugal fan of the above application examples, wherein in case that a distance between the edge portion of the inlet port and an outside surface of the impeller close to the edge portion in a direction perpendicular to the rotation axis is a distance $D1$, and a distance between an outside surface of the impeller opposed to the outside surface close to the edge portion with respect to the rotation axis and an inside surface of the housing close to the outside surface opposed to the outside surface close to the edge portion is a distance $D2$, the inclined portion is formed at the edge portion corresponding to the distance $D1$ where the condition $D1 \leq D2$ holds.

According to this centrifugal fan, the inclined portion is provided on the area of the edge portion corresponding to the distance $D1$ where the condition of $D1 \leq D2$ holds, more specifically, on the area of the edge portion on the side corresponding to the distance $D1$ which is the distance between the edge portion of the inlet port and the outside surface of the impeller close to the edge portion in the direction perpendicular to the rotation axis under the condition in which the distance $D1$ is equal to or shorter than the distance ($D2$) between the outside surface of the impeller opposed to the outside surface close to the edge portion with respect to the rotation axis and the inside surface of the housing close to the outside surface of the impeller opposed to the outside surface close to the edge portion. According to this structure, the inclined portion is disposed on the area with which the impeller easily engages when subjected to drop impact (area of the edge portion on the D1 side under D1≤D2), wherefore malfunction caused by drop impact can be efficiently prevented. Moreover, even when the edge portion of the first housing portion is thin, the inclined portion can be provided on the projecting portion formed on the area of the edge portion with which the impeller easily engages by drop impact. Thus, malfunction caused by the drop impact can be similarly avoided with high efficiency.

APPLICATION EXAMPLE 5

In the centrifugal fan of the above application example, it is preferable that the first housing portion of the centrifugal fan according to the above application examples is a plate-shaped metal component.

According to this centrifugal fan, engagement between the impeller and the edge portion is avoided in a preferable manner even when the first housing portion is constituted by a plate-shaped metal component for reduction of the thickness of the centrifugal fan. Thus, malfunction caused by drop impact can be prevented.

APPLICATION EXAMPLE 6

This application example is directed to a projector which includes: the centrifugal fan according to any one of the above application examples; a light source device which emits light; and a light modulation device which modulates light emitted from the light source device according to image information.

This projector includes the centrifugal fan capable of preventing malfunction caused by drop impact. Thus, the projector maintains stable cooling even when the projector is dropped.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments according to the invention are hereinafter described with reference to the drawings.

First Embodiment

Figure 1:
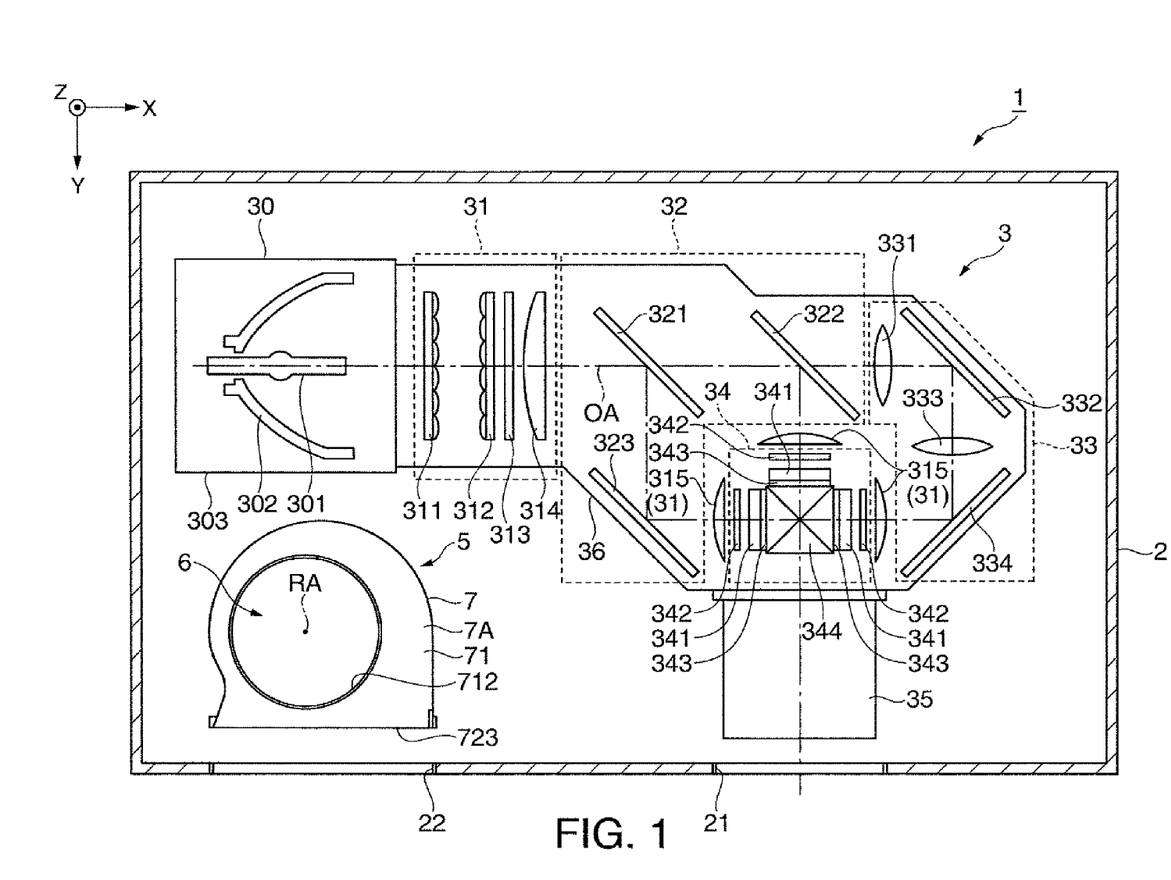
FIG. 1 schematically shows the general structure of a projector according to a first embodiment.

FIG. 1 schematically illustrates the general structure of a projector 1 according to a first embodiment. More specifically, FIG. 1 shows the internal structure of the projector 1 placed on a desk as viewed from above. The general structure of the projector 1 in this embodiment is now explained with reference to FIG. 1.

FIG. 1 and other figures to be referred to herein are illustrated on the basis of XYZ rectangular coordinate system for convenience of explanation. According to this XYZ rectangular coordinate system, the direction coinciding with an illumination optical axis OA and corresponding to such a direction in which light emitted from a light source device 30 travels is defined as the X (+X) direction, the direction perpendicular to the X direction and corresponding to such a direction in which image light is projected from a projection lens 35 is defined as the Y (+Y) direction, and the direction perpendicular to the X direction and the Y direction and corresponding to such a direction which agrees with the upward direction (opposite to the direction of gravity) when the projector 1 is placed on the desk is defined as the Z (+Z) direction. It should be noted that the dimensions and proportions of the respective components shown in FIG. 1 and other figures are different from the practical dimensions and proportions of the corresponding components so as to allow these components to have sufficient sizes for easy recognition in the respective figures.

The projector 1 in this embodiment is an electronic apparatus which modulates light emitted from a light source according to image information (image signals) and enlarges and projects the modulated light onto a screen or other projection surfaces. As illustrated in FIG. 1, the projector 1 includes an external housing 2 which constitutes the external casing of the projector 1, and an optical unit 3 and a centrifugal fan 5 as a cooling fan (exhaust fan) provided within the external housing 2, and others.

The external housing 2 has a substantially rectangular parallelepiped shape. An image opening 21 through which an image projected from the projection lens 35 (described later) of the optical unit 3 passes is formed in the +Y side surface of the external housing 2. On the other hand, a discharge port 22 through which heated air within the external housing 2 is discharged to the outside by the operation of the centrifugal fan 5 is also formed in the surface of the external housing 2 on the −X side of the image opening 21.

The optical unit 3, which has the functions of modulating light according to image information and projecting the modulated light, has a substantially L shape in the plan view which extends in the X direction and has one end expanded in the Y direction as illustrated in FIG. 1.

As illustrated in FIG. 1, the optical unit 3 includes the light source device 30 which has a light source lamp 301, a reflector 302, and a lamp housing 303, and an illumination device 31 which has lens arrays 311 and 312, a polarization converting element 313, a stacking lens 314, and a collimating lens 315. The optical unit 3 also includes a color separation device 32 which has dichroic mirrors 321 and 322, and a reflection mirror 323, and a relay device 33 which has an entrance side lens 331, a relay lens 333, and reflection mirrors 332 and 334. The optical unit 3 further includes an optical device 34 which has three liquid crystal panels 341 corresponding to light modulation devices, three entrance side polarization plates 342, three exit side polarization plates 343, and a cross dichroic prism 344 corresponding to a color combining device, and the projection lens 35 corresponding to a projection device. The optical unit 3 still further includes an optical component housing 36 which houses the light source device 30, the illumination device 31, the color separation device 32, the relay device 33, and the optical device 34 within the housing 36, and supports and fixes the projection lens 35 to a predetermined position.

The general operation of the optical unit 3 is now explained.

According to the foregoing structure, light emitted from the light source device 30 and transmitted through the illumination device 31 is separated into three color lights in red, green, and blue by the function of the color separation device 32. The separated color lights are modulated by the corresponding liquid crystal panels 341 according to image information. The modulated color lights are combined into image light by the cross dichroic prism 344, and projected onto a screen (not shown) or the like through the projection lens 35.

Figure 2A:
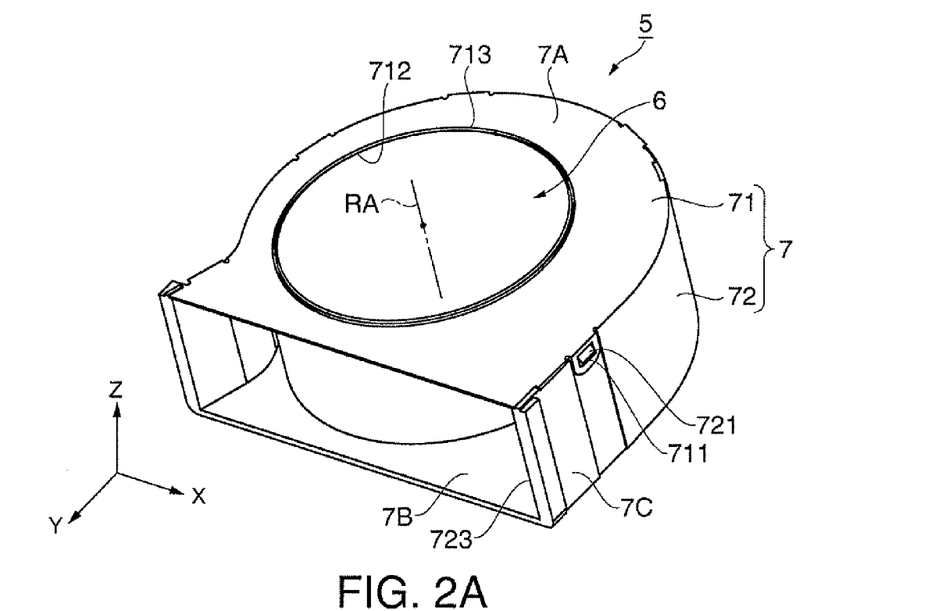
FIGS. 2A and 2B illustrate the general structure of a centrifugal fan.
Figure 2B:
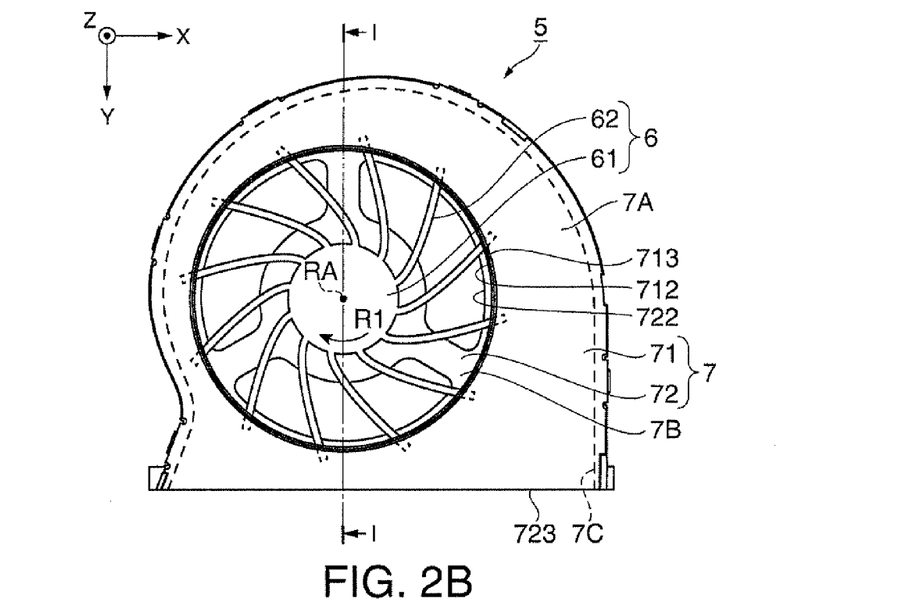
Figure 3A:
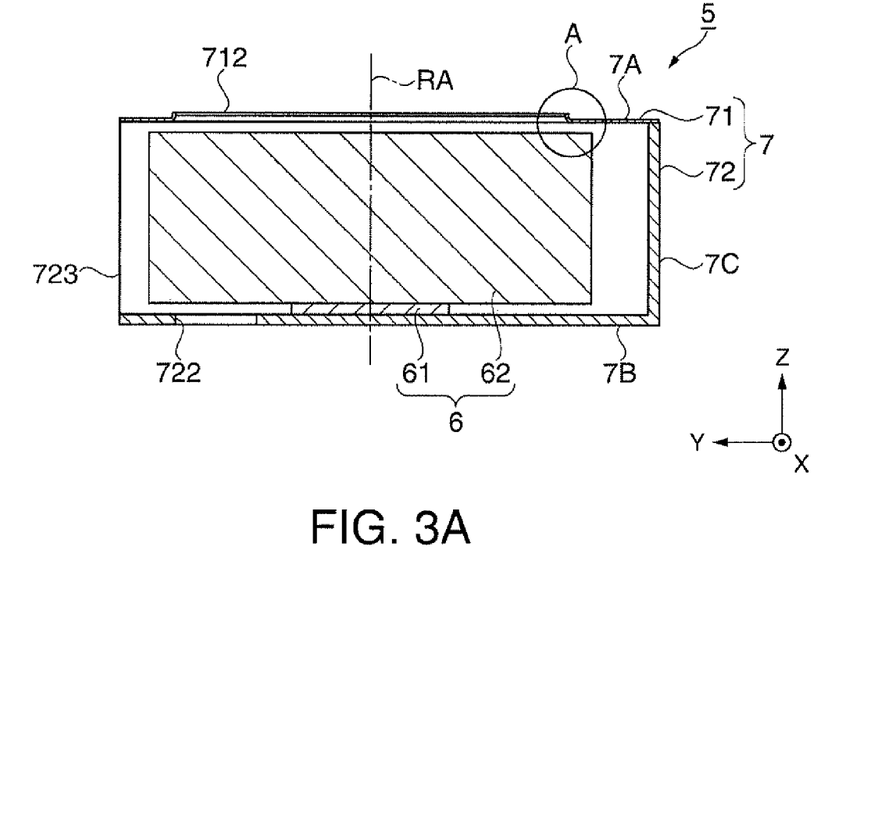
FIGS. 3A and 3B are cross-sectional views schematically illustrating the centrifugal fan.
Figure 3B:
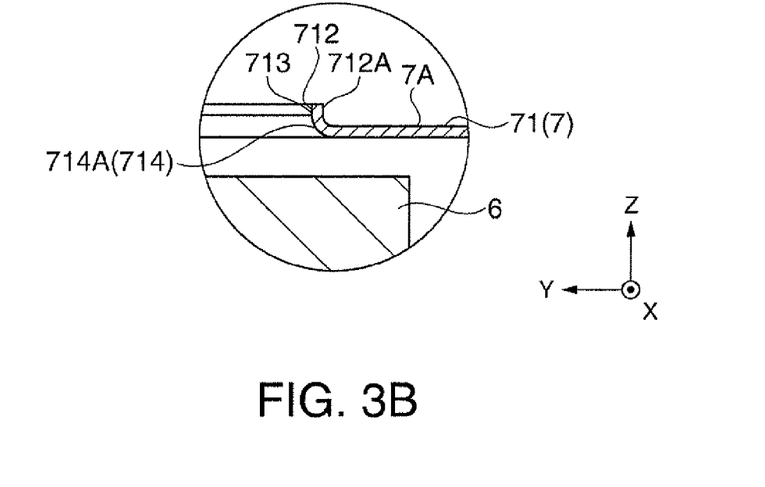

FIGS. 2A and 2B illustrate the general structure of the centrifugal fan 5. More specifically, FIG. 2A is a perspective view of the centrifugal fan 5, and FIG. 23 is a plan view of the centrifugal fan 5 as viewed from above. FIGS. 3A and 3B are cross-sectional views schematically showing the centrifugal fan 5. More specifically, FIG. 3A is a cross-sectional view taken along a line I-I in FIG. 23, and FIG. 3B is an enlarged view of an area A in FIG. 3A. The structure and operation of the centrifugal fan 5 are now discussed with reference to FIGS. 2A through 3B.

As illustrated in FIG. 1, the centrifugal fan 5 disposed in the vicinity of the discharge port 22 is a unit which discharges air heated within the external housing 2 to the outside through the discharge port 22. As can be seen from FIGS. 2A and 2B, the centrifugal fan 5 has an impeller 6 and a housing 7.

As illustrated in FIG. 2B, the impeller 6 has a cylindrical shaft 61, and a plurality of vanes 62 provided on the cylindrical shaft 61 and combined therewith into one body. The impeller 6 thus structured is supported within the housing 7 in such a condition as to be rotatable around a rotation axis RA. The plural vanes 62 are curved toward the rear with respect to a rotation direction R1 of the impeller 6. In this embodiment, the centrifugal fan 5 is constituted by a so-called turbo-fan.

The housing 7 is a unit for accommodating the impeller 6. As illustrated in FIGS. 2A and 2B, the housing 7 has a double-body structure constituted by a first housing portion 71 forming a top surface 7A, and a second housing portion 72 forming a bottom surface 7B and a side surface 70. The first housing portion 71 is a plate-shaped component made of metal. The second housing portion 72 is a substantially box-shaped component made of synthetic resin. The first housing portion 71 has a plurality of engaging holes 711 along the outer peripheral edge thereof, and is fixed to the second housing portion 72 by engagement between the engaging holes 711 and engaging claws 721 provided along the upper edge of the side surface of the second housing portion 72 in positions corresponding to the engaging holes 711.

The first housing portion 71 has a first inlet port 712 as a circular opening whose center agrees with the rotation axis RA. On the other hand, the second housing portion 72 has three second inlet ports 722 in the bottom surface 7B as three circular-arc-shaped long holes disposed along a circle whose center agrees with the rotation axis RA similarly to the first inlet port 712. In this arrangement, the first inlet port 712 and the second inlet ports 722 are positioned side by side along the rotation axis RA with the impeller 6 located between the first and second inlet ports 712 and 722. Accordingly, the centrifugal fan 5 in this embodiment has the first inlet port 712 in the top surface 7A and the second inlet ports 722 in the bottom surface 7B as two types of air inlet ports through which air can be introduced into the housing 7.

The second housing portion 72 of the housing 7 has no +Y side surface so that this side can be open. The opening defined by the opened side of the second housing portion 72 and the first housing portion 71 corresponds to an outlet port 723. Though not specifically shown in the figure, a driver circuit (circuit board) is provided on the bottom surface 7B to rotate the impeller 6 around the rotation axis RA by power supplied from the outside via a lead.

The centrifugal fan 5 thus constructed introduces air into the interior via the first inlet port 712 and the second inlet ports 722, and discharges the air via the outlet port 723 by rotation of the impeller 6 around the rotation axis RA in the rotation direction R1.

Returning now to FIG. 1, the centrifugal fan 5 is disposed within the external housing 2 in the vicinity of the light source device 30 and adjacent to the discharge port 22 as illustrated in the figure. The centrifugal fan 5 is positioned with the bottom surface 7B (see FIGS. 2A and 2B) facing to the bottom surface of the external housing 2 (−Z side), with the top surface 7A facing to the top surface of the external housing 2 (+Z side), and the outlet port 723 facing to the discharge port 22. The centrifugal fan 5 is so disposed that clearances are produced between the top surface 7A and the top surface of the external housing 2, and between the bottom surface 7B and the bottom surface of the external housing 2.

The centrifugal fan 5 positioned in this manner introduces air within the external housing 2, particularly air heated by the light source device 30, from the clearance on the top surface 7A side and the clearance on the bottom surface 7B side via the first inlet port 712 and the second inlet ports 722 (see FIGS. 2A and 2B) by rotation of the impeller 6 around the rotation axis RA. The centrifugal fan 5 discharges the introduced air from the outlet port 723 to the outside of the external housing 2 via the discharge port 22. This operation of the centrifugal fan 5 maintains an appropriate temperature of the interior of the projector 1.

As illustrated in FIGS. 3A and 3B, a projecting portion 713 projecting in the direction opposite to the air intake direction is provided on the entire circumference of an edge portion 712A of the first inlet port 712 of the first housing portion 71. The air intake direction in this context is a direction coinciding with the rotation axis RA and extending from the first inlet port 712 toward the impeller 6 (−Z direction). Thus, the projecting portion 713 projects in the +Z direction.

Moreover, an inclined portion 714 having a convexly curved shape 714A is provided on the entire circumference of the projecting portion 713 of the edge portion 712A on the side facing to the impeller 6 as illustrated in FIG. 3B. The convexly curved shape 714A is widening to the side that impeller 6 is disposed. The projecting portion 713 and the inclined portion 714 in this embodiment are formed by drawing the first housing portion 71 constituted by a plate-shaped metal component.

According to the foregoing embodiment, the following advantages can be provided.

In the case of the centrifugal fan 5 in this embodiment, the entire circumference of the edge portion 712A of the first inlet port 712 has the projecting portion 713 projecting in the direction opposite to the air intake direction. The edge portion 712A on the side facing to the impeller 6 has the inclined portion 714 widening to the side that the impeller 6 is disposed. This structure secures a sufficient size of the inclined portion 714 even when the edge portion 712A of the first inlet port 712 of the first housing portion 71 is thin. Thus, the impeller 6 subjected to drop impact comes in contact with the inclined portion 714, and then returns to the original position. This mechanism avoids engagement between the impeller 6 and the edge portion 712A, thereby preventing malfunction of the centrifugal fan 5 caused by drop impact.

According to the centrifugal fan 5 in this embodiment, the first housing portion 71 is a plate-shaped metal component, and the inclined portion 714 on the projecting portion 713 has the convexly curved shape 714A. In this case, the projecting portion 713 having the convexly curved shape 714A can be efficiently produced on the first housing portion 71 by drawing the first housing portion 71.

According to the centrifugal fan 5 in this embodiment, the first housing portion 71 is a plate-shaped metal component, and the projecting portion 713 is provided on the entire circumference of the edge portion 712A of the first inlet port 712. In this case, the rigidity of the first housing portion 71 increases even when the first housing portion 71 is thin.

According to this embodiment, the projector 1 includes the centrifugal fan 5 capable of preventing malfunction caused by drop impact. Thus, the projector 1 can maintain stable cooling even at the time of drop.

Second Embodiment

Figure 4:
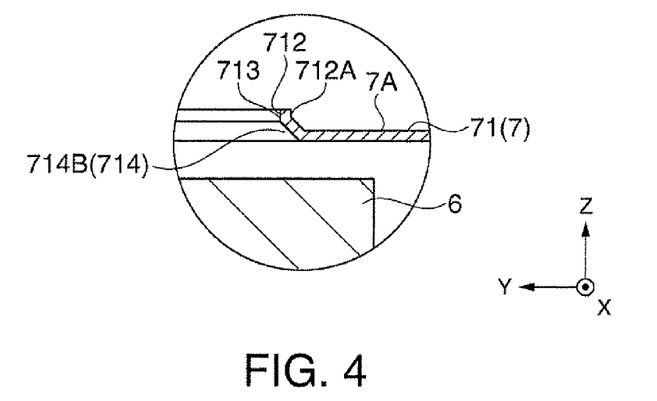
FIG. 4 is a cross-sectional view schematically illustrating an inclined portion of a centrifugal fan according to a second embodiment.

FIG. 4 is a cross-sectional view schematically illustrating the inclined portion 714 of the centrifugal fan 5 according to a second embodiment. The structure of the inclined portion 714 in this embodiment is now explained with reference to FIG. 4.

The inclined portion 714 of the projecting portion 713 included in the centrifugal fan 5 in this embodiment is different in its shape from the inclined portion 714 in the first embodiment. Other structures are similar to the corresponding structures in the first embodiment. As illustrated in FIG. 4, the inclined portion 714 has a linear shape 714B widening to the side that the impeller 6 is disposed.

According to this embodiment, the following advantage can be offered as well as the advantages provided in the first embodiment.

In the case of the centrifugal fan 5 in this embodiment, the cross section of the inclined portion 714 is allowed to have the linear shape 714B. As obvious from this example, the shape of the inclined portion 714 is not limited to the convexly curved shape 714A as in the first embodiment but may be designed in various shapes with a high degree of freedom.

Third Embodiment

Figure 5:
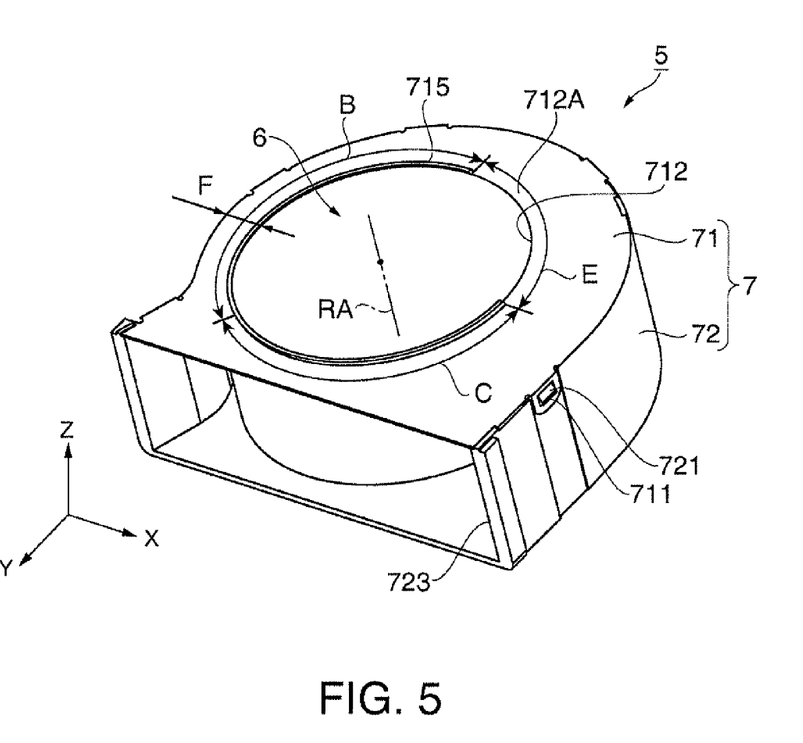
FIG. 5 is a perspective view schematically showing a projecting portion of a centrifugal fan according to a third embodiment.
Figure 6:
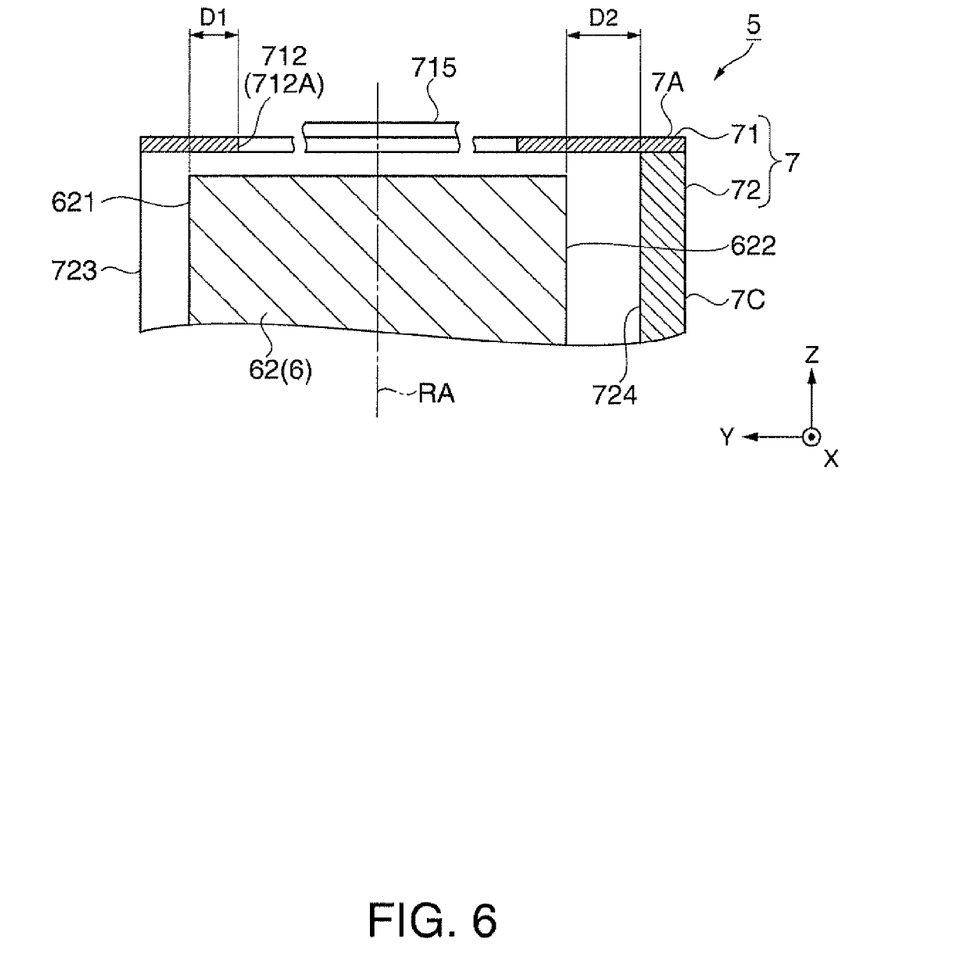
FIG. 6 is a cross-sectional view schematically illustrating the centrifugal fan according to the third embodiment.

FIG. 5 is a perspective view schematically illustrating a projecting portion 715 of the centrifugal fan 5 according to a third embodiment. FIG. 6 is a cross-sectional view schematically illustrating the centrifugal fan 5 in the third embodiment. The structure of the projecting portion 715 and the structure of the inclined portion provided on the projecting portion 715 according to this embodiment are now explained with reference to FIGS. 5 and 6.

Basically, the projecting portion 715 in this embodiment projects in the same direction as the direction of the projecting portion 713 in the first embodiment. However, as illustrated in FIG. 5, the projecting portion 715 is not provided on the entire circumference of the edge portion 712A of the first inlet port 712 but only on a part of the circumference of the edge portion 712A unlike the first embodiment.

More specifically, the projecting portion 715 is formed on an area where a distance F between the external shape of the first housing portion 71 and the first inlet port 712 is short. Further specifically, the projecting portion 715 is disposed on an area B and an area C as illustrated in FIG. 5. However, the projecting portion 715 is not provided on an area E other than the areas B and C.

An inclined portion (not shown) widening to the side that the impeller 6 is disposed is formed on the edge portion 712A of the projecting portion 715 on the side facing to the impeller 6. The shape of the cross section of the inclined portion may be either the convexly curved shape 714A in the first embodiment (see FIG. 3B) or the linear shape 714E in the second embodiment (see FIG. 4). The inclined portion is not provided on the edge portion 712A where the projecting portion 715 is not formed (area E).

Described herein with reference to FIG. 6 are the details of the reason for providing the inclined portion of the projecting portion 715 on the limited area where the distance F between the external shape of the first housing portion 71 and the first inlet port 712 is short.

FIG. 6 illustrates the cross section of the centrifugal fan 5 taken along a plane containing the rotation axis RA. A distance D1 corresponds to the distance in the direction perpendicular to the rotation axis RA between the edge portion 712A of the first inlet port 712 (outside surface of the first inlet port 712 in this embodiment) and an outside surface 621 (first outside shape portion) of the impeller 6 in a radial direction of the rotation axis to the edge portion 712A, and a distance D2 corresponds to the distance between an outside surface 622 (second outside shape portion) opposed to the outside surface 621 with respect to the rotation axis RA and an inside surface 724 of the second housing portion 72 opposed to the outside surface 622, on the assumption that the centrifugal fan 5 does not have the projecting portion 715.

When the centrifugal fan 5 falls in such a manner that the distance D2 side descends first under the condition of the distance D1 the distance D2, the outside surface 622 collides with the inside surface 724 by drop impact. Since the condition of the distance D1≤the distance D2 holds, the outside surface 621 of the impeller 6 on the distance D1 side shifts closer to the rotation axis RA than the position of the edge portion 712A with respect to the rotation axis RA. In this case, the impeller 6 temporarily projects from the first inlet port 712, and then returns to the original position. However, the outside surface 621 catches on the edge portion 712A and engages therewith before returning to the original position.

Therefore, when the centrifugal fan 5 falls in such a manner that the distance D2 side descends first under the condition in which the distance D1 is equal to the distance D2 or shorter, the outside surface 621 of the impeller 6 on the distance D1 side easily engages with the edge portion 712A. For preventing this problem, the inclined portion is equipped on the area of the edge portion 712A on the distance D1 side under the condition of the distance D1≤the distance D2.

On the other hand, when the distance D1>the distance D2, the outside surface 621 is located closer to the second housing portion 72 than the position of the edge portion 712A with respect to the second housing portion 72 at the time of fall of the centrifugal fan 5 and collision between the outside surface 622 and the inside surface 724 due to the condition of the distance D1>the distance D2. In this case, the impeller 6 does not project from the first inlet port 712. Accordingly, the outside surface 621 does not engage with the edge portion 712A, which eliminates the necessity for forming the inclined portion and the projecting portion on this area.

According to this embodiment, the first housing portion 71 is a plate-shaped metal component similarly to the first embodiment and thus does not have a sufficient thickness for producing the inclined portion. Thus, the projecting portion 715 is produced by drawing similarly to the first embodiment so that the inclined portion can be formed thereon. In this embodiment, the thickness of the side surface 7C of the second housing portion 72 is substantially uniform, in which condition the position of the projecting portion 715 is determined within the area where the distance F between the external shape of the first housing portion 71 and the first inlet port 712 is short.

According to this embodiment, the following advantages can be offered as well as the advantages provided in the first embodiment.

In the case of the centrifugal fan 5 in this embodiment, the inclined portion having a sufficient size can be formed on the projecting portion 715 provided on the B and C areas of the edge portion 712A even when the edge portion 712A of the first inlet port 712 of the first housing portion 71 is thin and therefore does not have a sufficient area for producing the inclined portion. Accordingly, the projecting portion 715, and thus the inclined portion, can be formed on the area with which the impeller 6 easily engages when subjected to drop impact. In other words, assuming that the distance between the edge portion 712A of the first inlet port 712 (outside surface of the first inlet port 712 in this embodiment) and the outside surface 621 of the impeller 6 close to the edge portion 712A is the distance D1, and that the distance between the outside surface 622 of the impeller 6 on the side opposed to the outside surface 621 with respect to the rotation axis RA and the inside surface 724 of the second housing portion 72 close to the outside surface 622 is the distance D2, the inclined portion is provided on the area of the edge portion 712A on the distance D1 side under the condition of the distance D1≤the distance D2. In this case, the inclined portion is positioned on the area with which the impeller 6 easily engages (area of the edge portion 712A on the distance D1 side under the condition of the distance D1≤the distance D2) when subjected to drop impact, wherefore malfunction caused by drop impact can be efficiently avoided. Accordingly, efficient prevention of malfunction caused by drop impact can be achieved by the inclined portion equipped on the projecting portion 715 formed on the area with which the impeller 6 easily engages by drop impact even when the edge portion 712A of the first inlet port 712 of the first housing portion 71 is thin.

According to the centrifugal fan 5 in this embodiment, the projecting portion 715 (inclined portion) is not provided on the area other than the necessary area (E area, i.e., area of the edge portion 712A on the distance D1 side where D1>D2). In this case, a wider clearance is produced in the area where the projecting portion 715 (inclined portion) is not formed even when the thickness of the projector 1 is reduced, in which condition a larger amount of air can be introduced into the projector 1. Accordingly, efficient cooling for the projector 1 can be realized.

Fourth Embodiment

FIGS. 7A through 7D are cross-sectional views schematically illustrating an inclined portion 751 of the centrifugal fan 5 according to a fourth embodiment. The structure of the inclined portion 751 in this embodiment is herein explained with reference to FIGS. 7A through 7D.

According to the centrifugal fan 5 in this embodiment, a first housing portion 75 constituting the housing 7 is made of synthetic resin and has a larger plate thickness than the thickness of the first housing portion 71 in the first embodiment. Thus, the first housing portion 75 has a sufficient thickness for producing the inclined portion 751 thereon, and does not require the projecting portion 713 unlike the first embodiment. Moreover, the fixing structure (not shown) to the second housing portion 72 is slightly different. Other structures are similar to the corresponding structures in the first embodiment.

The first housing portion 75 has the inclined portion 751 on the entire circumference of the edge portion 712A of the first inlet port 712. The inclined portion 751 is configured to widen to the side that the impeller 6 is disposed.

Figure 7A:
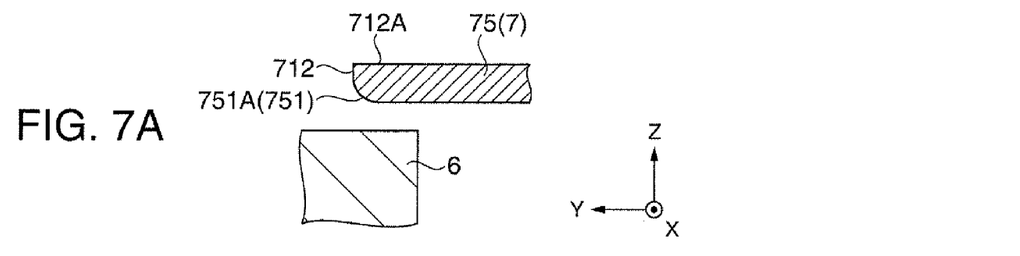
FIGS. 7A through 7D are cross-sectional views schematically illustrating an inclined portion of a centrifugal fan according to a fourth embodiment.
Figure 7B:
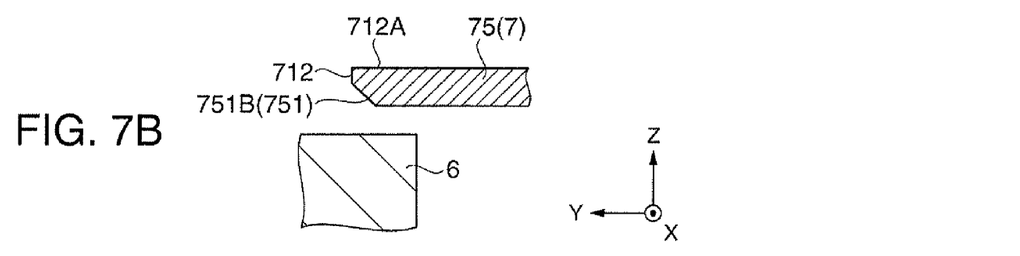

The inclined portion 751 shown in FIG. 7A has a cross section having a convexly curved shape 751A, while the inclined portion 751 shown in FIG. 7B has a cross section having a linear shape 751B.

Figure 7C:
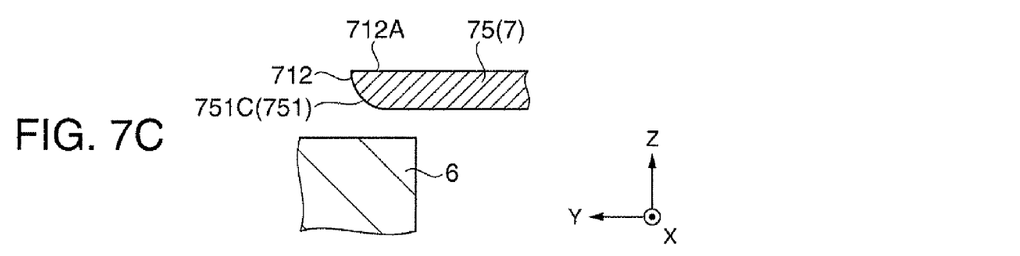
Figure 7D:
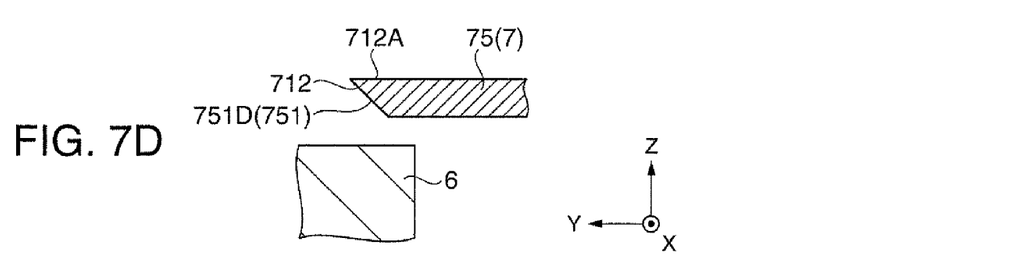

The inclined portion 751 shown in FIG. 7C expands from the impeller 6 side of the edge portion 712A of the first inlet port 712 toward above. More specifically, the inclined portion 751 has a cross section having a convexly curved shape 751C. The inclined portion 751 shown in FIG. 7D expands from the impeller 6 side of the edge portion 712A of the first inlet port 712 toward above similarly to the inclined portion 751 shown in FIG. 7C. More specifically, the inclined portion 751 has a cross section having a linear shape 751D.

According to this embodiment, the following advantage can be offered as well as the advantages provided in the first embodiment.

In the case of the centrifugal fan 5 in this embodiment, the necessity for providing the projecting portion 713 as in the first embodiment is eliminated when the first housing portion 75 has a sufficient thickness for producing the inclined portion 751. Moreover, the cross-sectional configuration of the inclined portion 751 can be determined with a higher degree of freedom as apparent from above.

Although various embodiments of the invention have been illustrated in the accompanying drawings and described in the foregoing detailed description, it will be understood that the invention is not limited to the embodiments disclosed, but is susceptible to numerous modifications and variations including the following changes without departing from the spirit and scope of the invention.

According to the centrifugal fan 5 in the first embodiment, the inclined portion 714 has the cross section having the convexly curved shape 714A. In addition, the inclined portion 714 of the centrifugal fan 5 in the second embodiment has the cross section having the linear shape 714B. However, the cross-sectional shape of the inclined portion 714 is not limited to these shapes 714A and 714B but may be other shapes such as a shape of the combination of the convexly curved shape and the linear shape. This applies to the shapes of the corresponding components in the second, third, fourth embodiments.

The projecting portion 713 of the first housing portion 71 formed by drawing according to the centrifugal fan 5 in the first embodiment may be formed by other methods. Moreover, the first housing portion 71 made of metal in this embodiment, and the projecting portion provided thereon, may be made of synthetic resin. This applies to the corresponding components in the second and third embodiments.

According to the centrifugal fan 5 in the fourth embodiment, the first housing portion 75 is a synthetic resin component having a sufficient plate thickness for producing the inclined portion 751, and therefore does not include the projecting portion. This structure is applicable to the corresponding structures in the second and third embodiments. In the case of the third embodiment to which the structure in the fourth embodiment is applied, the inclined portion 751 may be provided on the B area and the C area shown in FIG. 5.

According to the respective embodiments (first through fourth embodiments), the centrifugal fan 5 is constituted by a turbo-fan of a double inlet type having the first inlet port 712 and the second inlet ports 722. However, the centrifugal fan 5 may be a single inlet type turbo-fan which has either the first inlet port 712 or the second inlet ports 722.

The centrifugal fan 5 in this embodiment constituted by a so-called turbo-fan may be a sirocco fan.

According to the respective embodiments, the centrifugal fan 5 is a discharge fan which discharges air heated within the projector 1 (within the external housing 2) to the outside of the external housing 2. However, the centrifugal fan 5 may be a unit which introduces air from the outside of the projector 1 and supplies the air to the components generating heat within the optical unit 3 or other components generating heat (such as a power source device) to cool these components.

According to the projector 1 in the respective embodiments, the light source lamp 301 of the optical unit 3 is constituted by an extra-high pressure mercury lamp. However, the light source lamp 301 is not limited to this lamp but may be any of various discharge types of lamps capable of emitting high-luminance light, such as a metal halide lamp and a high-pressure mercury lamp.

According to the projector 1 in the respective embodiments, the optical unit 3 has the lens integrator system containing the lens arrays 311 and 312 to equalize the illuminance of the emitted light. However, the optical unit 3 may have a rod integrator system containing a light guide rod for this purpose.

According to the projector 1 in the respective embodiments, the liquid crystal panels 341 of the optical unit as light modulation devices are constituted by transmission-type liquid crystal panels. However, the light modulation devices included therein may be reflection-type light modulation devices such as reflection-type liquid crystal panels.

According to the projector 1 in the respective embodiments, the optical unit 3 has the liquid crystal panels 341 as light modulation devices. However, the optical unit 3 may have other components generally available as devices for modulating received light according to image signals, such as a micromirror-type light modulation device. An example of the micromirror-type light modulation device is a DMD (digital micromirror device).

According to the projector 1 in the respective embodiments, the light modulation devices included in the optical unit 3 are of a so-called three-plate type which uses three liquid crystal panels 341 for red light, green light, and blue light. However, the light modulation devices may be of a single-plate type. Moreover, a liquid crystal panel for the purpose of contrast improvement may be equipped.

What is claimed is:

1. A projector comprising:
   a light source device which emits light;
   a light modulation device which modulates light emitted from the light source device according to image information; and
   a centrifugal fan introducing air via an inlet port in a direction of a rotation axis and discharging the air via an outlet port in a direction of a centrifugal force produced by rotation, the centrifugal fan having
   an impeller having a plurality of vanes around the rotation axis, and
   a housing including the inlet port and supporting the impeller such that the impeller is allowed to freely rotate in the housing, wherein
   the housing includes an inclined portion formed at least at a part of an edge portion of the inlet port, the inclined portion widening to the side that the impeller is disposed, and the impeller being arranged to freely rotate relative to the inclined portion.

2. The projector according to claim 1, wherein
   the inclined portion has a convexly curved shape.

3. The projector according to claim 1, wherein
   a projecting portion is formed at least at the part of the edge portion, the projecting portion projecting in a direction opposite to a direction introducing the air, and
   the inclined portion is formed at the projecting portion.

4. The projector according to claim 1, wherein
   the inclined portion is formed at the edge portion of the inlet port corresponding to an area where a distance between an external shape of the housing and the edge portion of the inlet port is short.

5. The projector according to claim 1, wherein
   the inclined portion is formed at the edge portion of the inlet portion according to a first distance D1 and a second distance D2 such that D1≤D2, wherein the first distance D1 is defined between the edge portion of the inlet port and a first outside surface of the impeller close to the edge portion in a direction perpendicular to the rotation axis and the second distance D2 is defined between a second outside surface of the impeller opposed to the first outside surface of the impeller and an inside surface of the housing close to the second outside surface of the impeller.

6. The projector according to claim 1, wherein
   the housing includes a first housing portion that is a plate-shaped metal component.

\* \* \* \* \*